United States Patent
Elliott et al.

(10) Patent No.: US 6,985,476 B1
(45) Date of Patent: Jan. 10, 2006

(54) AUTOMATIC SETTING OF TIME-TO-LIVE FIELDS FOR PACKETS IN AN AD HOC NETWORK

(75) Inventors: Brig Barnum Elliott, Arlington, MA (US); David Spencer Pearson, Bennington, VT (US)

(73) Assignee: BBNT Solutions LLC, Cambridge, MA (US)

( * ) Notice: Subject to any disclaimer, the term of this patent is extended or adjusted under 35 U.S.C. 154(b) by 887 days.

(21) Appl. No.: 09/933,380

(22) Filed: Aug. 20, 2001

(51) Int. Cl.
*H04J 3/26* (2006.01)

(52) U.S. Cl. ...................... 370/349; 370/474
(58) Field of Classification Search .............. 370/311, 370/328, 338, 345, 349, 401, 474
See application file for complete search history.

(56) References Cited

U.S. PATENT DOCUMENTS

| | | | |
|---|---|---|---|
| 6,310,858 B1 * | 10/2001 | Kano et al. ................. | 370/235 |
| 2003/0009594 A1 * | 1/2003 | McElligott .................. | 709/245 |
| 2003/0048793 A1 * | 3/2003 | Pochon et al. .............. | 370/401 |
| 2003/0103459 A1 * | 6/2003 | Connors et al. ............ | 370/235 |
| 2003/0204619 A1 * | 10/2003 | Bays ........................... | 709/238 |
| 2004/0151179 A1 * | 8/2004 | Andre et al. ................ | 370/392 |
| 2004/0252693 A1 * | 12/2004 | Cheriton et al. .......... | 370/395.1 |
| 2005/0047350 A1 * | 3/2005 | Kantor et al. ............... | 370/254 |

* cited by examiner

*Primary Examiner*—Melvin Marcelo
(74) *Attorney, Agent, or Firm*—Fish & Neave IP Group Ropes & Gray LLP

(57) ABSTRACT

The present invention helps increase the reliability, throughput, and ease-of-configuration for data networks. The invention sets "time-to-live" ("TTL") values for packets which may be routed through a network within a router based on a selected route, rather than by a host computer or using a fixed pre-configured value. Upon receiving an incoming data packet from a host computer, a TTL value is set which tailored to network conditions and the route selected. The data packet is then routed within the network using the tailored TTL and is discarded more quickly than if a large default value were used.

15 Claims, 6 Drawing Sheets

| Destination | Next Hop | Metric |
| --- | --- | --- |
| 100 | 100 | 1 |
| 102 | 110 | 4 |
| 102 | 112 | 5 |
| 104 | 110 | 4 |
| 104 | 112 | 3 |
| | | |

FIG. 3

AUTOMATIC SETTING OF TIME-TO-LIVE FIELDS FOR PACKETS IN AN AD HOC NETWORK

DESCRIPTION OF THE INVENTION

1. Field of the Invention

This invention relates to routing of data packets. More particularly, it relates to a method, and apparatus for automatically setting the lifetime of data packets in a network.

2. Background of the Invention

In present telecommunications networks, routers may be used to forward a data packet from a source to a destination across the network. Routers typically determine a route based on the destination address for the data packet. For example, a router may determine the route by searching a routing table based on the packet's destination address. The router then forwards the data packet along the determined route, e.g., to another router or to the destination.

However, routing "loops" may develop as routers forward the data packet. Routing loops occur when a data packet is endlessly forwarded from one router to another router. Routing loops may be caused by a change in network conditions such as a failure in equipment. Since routing of packets consume processing resources of routers, routing loops decrease network efficiency and may eventually lead to a failure if left unresolved.

Routing loops are especially problematic in multi-hop wireless telecommunications networks. Wireless telecommunications networks typically have low to moderate link capacities. When routing loops occur, routers unnecessarily consume network capacity by forwarding data packets within routing loops. As a result, routing loops may further aggravate congestion in wireless telecommunications networks.

In addition, wireless telecommunications networks often rely on battery powered routers. As a result, conserving battery power is an important consideration for wireless telecommunications networks. However, routers consume power as they forward data packets. Thus, avoiding routing loops may be important for conserving battery power in a wireless telecommunications network.

One technique used to avoid routing loops is the assignment of a finite lifetime to a data packet. For example, a finite lifetime can be assigned in a time-to-live field in the header of an Internet protocol ("IP") packet. As an IP packet is routed, routers within a network will examine and decrement the TTL. If an IP packet's TTL reaches 0, then it is discarded. Thus, if the IP packet is within a routing loop, TTL ensures that the IP packet is eventually discarded and the routing loop ended.

Unfortunately, conventional technology often requires that a router, which assigns a lifetime to a data packet, be configured to use a default TTL value. A host, such as personal computer, may also be configured to assign a default TTL value for a data packet. However, configuring routers or a host is often an error-prone process that can adversely affect network performance. For example, a configuration which sets a TTL value too low may prevent a data packet from reaching its destination. Thus, routers and hosts are often pre-configured to use a maximum value, i.e., 64 for IP data packets, as a TTL value.

Furthermore, hosts often do not have an awareness of network conditions prior to sending a data packet. Accordingly, host computers often set the TTL to its maximum value to ensure the data packet reaches its destination. Thus, present telecommunications networks typically use a TTL value, which is unnecessarily high and not tailored to network conditions.

SUMMARY OF THE INVENTION

To overcome these and other shortcomings of the prior art, methods and apparatus may be provided for automatically setting time-to-live values in data packets in network nodes aware of network conditions. Thus allowing, for example, the use of time-to-live values which may be more accurate and tailored to network conditions.

In accordance with the principles of the present invention, a method for routing data packets in a network comprises receiving a data packet having a destination. A route for the data packet based on the destination is determined. A lifetime for the data packet based on the route is determined. A time-to-live value for the data packet based on the lifetime is set and the data packet is forwarded along the route.

In accordance with another embodiment of the present invention, a method of routing packets in a network comprises receiving a data packet having a destination. A route for the data packet based on the destination is determined. A first time-to-live value set for the data packet is determined. The first time-to-live value modified to form a second time-to-live value and the data packet is forwarded along the route based on the second time-to-live value.

In accordance with yet another embodiment of the present invention, a node for processing a data packet comprises: an input to receive a data packet having a destination; a route processor to determine at least one route for the data packet based on the destination; a lifetime processor to set a lifetime for the data packet based on the at least one route; and an output to forward the data packet along the route.

In accordance with yet another embodiment of the present invention, an apparatus comprises: means for receiving a data packet having a destination; means for determining a route for the data packet based on the destination; means for determining a lifetime for the data packet based on the route; means for setting a time-to-live value for the data packet based on the lifetime; and means for forwarding the data packet along the route.

In accordance with yet another embodiment of the present invention, a computer readable medium capable of configuring a device to perform a method for managing data packets in a network, wherein the method comprises: receiving a data packet having a destination; determining a route for the data packet based on the destination; determining a lifetime for the data packet based on the route; setting a time-to-live value for the data packet based on the lifetime; and forwarding the data packet along the route.

In accordance with yet another embodiment of the present invention, a data packet with a time-to-live set based on lifetime for a determined route comprises: a field identifying a destination; and a time-to-live field set based on a determined likely route the data packet will travel to reach the destination.

In accordance with yet another embodiment of the present invention, a data packet with an adjustable time-to-live traveling within a network comprises: a field to identify a destination for the data packet; and a time-to-live field, adjusted within the network based upon a condition of a determined likely route the data packet will travel to reach the destination, to indicate a lifetime for the data packet.

In accordance with yet another embodiment of the present invention, a network for forwarding a data packet from a source to a destination based on a lifetime for the data packet along a route comprises a first node and a second node. The first node includes: means for receiving, from a source, a data packet having a destination; means for determining a route for the data packet based on the destination; means for determining a lifetime for the data packet based on the route; means for setting a time-to-live value for the data packet based on the lifetime; and means for forwarding the data packet to a second node along the route. The second node includes: means for receiving, from the first node, the data packet; means for determining the time-to-live value set for the data packet; and means for modifying the time-to-live value to form a modified time-to-live value; means for forwarding the data packet based on the modified time-to-live value.

Additional benefits and advantages of the invention will be set forth in part in the description which follows, and in part will be obvious from the description, or may be learned by practice of the invention. The advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention. In the figures:

FIG. 3 shows a detailed view of a routing table consistent with the present invention;

DETAILED DESCRIPTION

Reference will now be made in detail to the present embodiments the invention, examples of which are illustrated in the accompanying drawings. Wherever possible, the same reference numbers will be used throughout the drawings to refer to the same or like parts.

In accordance with the principles of the present invention the time-to-live ("TTL") of a data packet may be set within a network, such as within a node of the network. Methods and apparatus consistent with the present invention may determine a data packet's TTL value automatically based on network conditions. Setting the TTL value based on network conditions allows the TTL to be set more appropriately, than if pre-configured or set to a fixed value. Furthermore, setting the TTL value based on network conditions eliminates the probability of incorrectly setting TTL values.

In one embodiment, a wireless telecommunications network may use ad-hoc routers executing algorithms and protocols to determine a tailored TTL value for data packets based on network conditions. Alternatively, the principles of the present invention may also apply to wireline-based networks.

Figure 1:
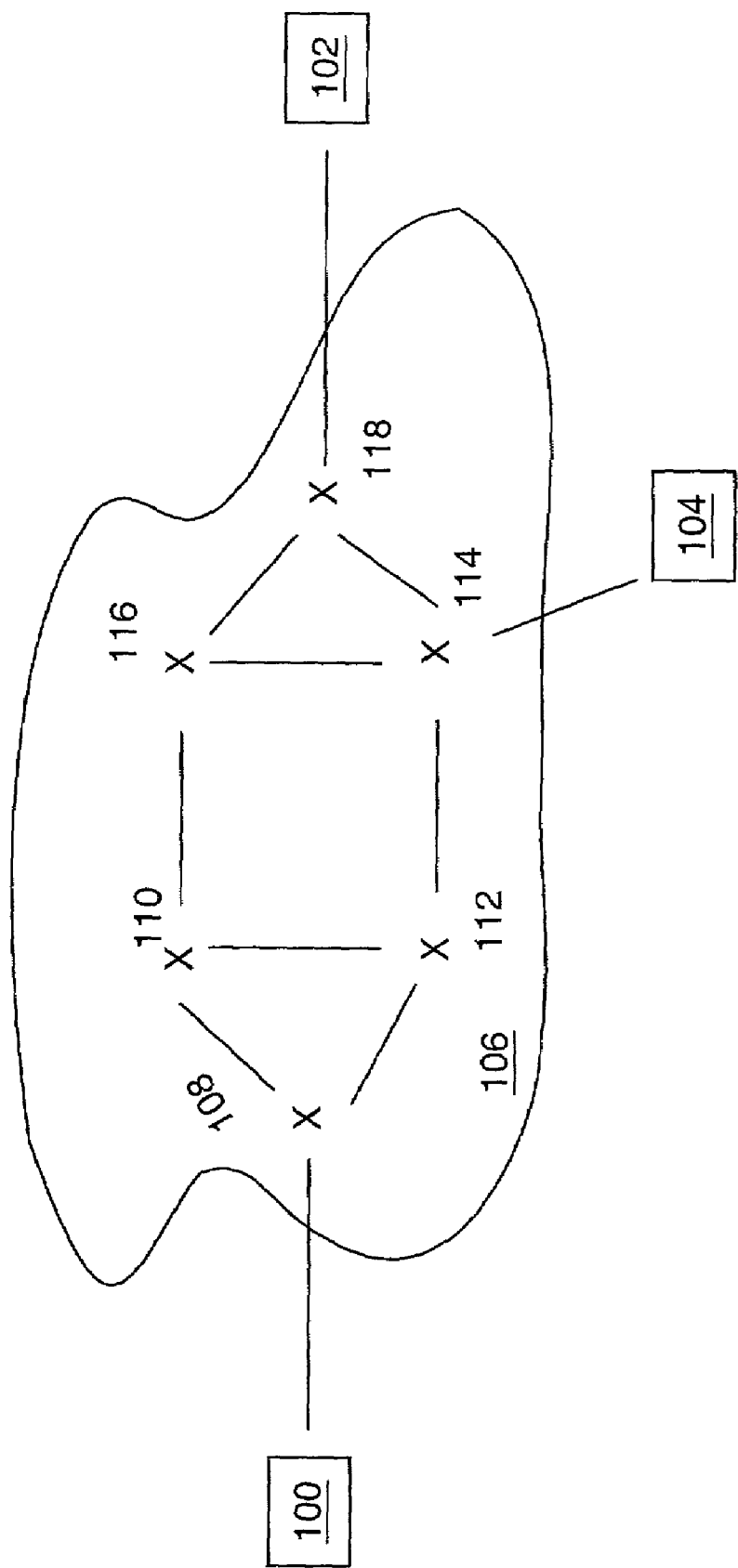
FIG. 1 illustrates an exemplary network in which methods and apparatus consistent with the present invention may be implemented.

FIG. 1 illustrates an exemplary network in which methods and apparatus consistent with the present invention may be implemented. In particular, hosts 100, 102, and 104 may be coupled together by a network 106. Hosts 100, 102, and 104 may act as a source and/or destination for data packets. For example, hosts 100, 102, and 104 may be devices such as personal computers, processors, or workstations. Hosts 100, 102, and 104 may also be mobile laptop computers, which communicate with network 106 via a wireless modem (not shown). Other devices capable of acting as a source and/or destination for a data packet may be used in accordance with the principles of the present invention. Examples of such devices include cellular telephones, personal digital assistants, pagers, and other wireless devices.

Network 106 may be comprised of nodes 108, 110, 112, 114, 116 and 118. Nodes 108, 110, 112, 114, 116 and 118 forward data packets from their source to their destination. Nodes 108, 110, 112, 114, 116 and 118 may be implemented by any combination of software and hardware in accordance with the principles of the present invention. For example, a node, such as node 108, may receive data packets, determine the destination, determine a route, determine an appropriate lifetime, set a TTL value, and forward the data packets to their appropriate destination.

Nodes 108, 110, 112, 114, 116 and 118 may be implemented as ad-hoc routers (or other equipment to perform routing operations) using one or more wireless interfaces. Ad-hoc routers may utilize various algorithms and wireless protocols in order to discover other nearby routers, form neighbor relationships with these routers, and forward data packets through network 106. These protocols may include, e.g., shortest path first (SPF), distance vector (DV), mobile ad-hoc network (MANET), and ad-hoc on demand distance vector (AODV).

Other routing algorithms and protocols may be implemented in hardware and software or combination thereof in accordance with the principles of the present invention. Examples of devices for wireless ad-hoc networks include the Motorola™ Bluetooth™ PC Card, and the CiSCO™ Aironet Wireless LAN Adapters.

SPF (also known as "link state" or open shortest path first) may have all routers in a network transmit routing information to all other routers in the network. Subsequently, each router may send only routing updates describing the state of its own links. For example, using SPF, node 108 may send routing information to nodes 110, 112, 116, 114, and 118. A description of an OSPF may be found in RFC-1247, titled "OSPF Version 2", by J. Moy, (1991), which is incorporated herein by reference in its entirety. Thus, under SPF, routing information may be sent to the entire network.

DV has each router send all or portions of its routing information, but only to its immediate neighbors. For example, node 108 may send routing information to neighboring nodes 110 and 112. Thus, under DV, routing information is exchanged between neighboring nodes.

AODV applies algorithms similar to DV in an ad-hoc wireless network. In general, upon receiving a data packet with an unresolved destination, AODV may have a node, such as node 108, may broadcast a route request message to its neighbors, e.g., nodes 110 and 112. The route request message may include a last sequence number for data packet sent to that destination. The route request message may be then sent through the network 106 until it reaches a node, e.g., node 118, that has a route to the destination. Each node may also create a reverse route for itself back to a data packet's source, e.g., host 100.

When the route request message reaches node 118, node 118 may then generate a route reply that contains the number of hops necessary to reach the destination and a sequence number for the destination most recently seen by the router generating the reply. Each router that participates in forwarding this reply back toward the originator of the route request then creates a forward route to the destination. However, each router remembers only the next hop and not the entire route.

In order to maintain routes, AODV normally requires that each router periodically transmit a ('Hello') message, at some rate, e.g., once per second. Failure to receive a sufficient number, e.g., three consecutive, ('Hello') messages from a neighbor may be taken as an indication that the link to the neighbor in question may be down. When a link goes down, any upstream router that has recently forwarded packets to a destination using that link may be notified via an unsolicited route reply containing an infinite metric for that destination. Upon receipt of such a route reply, the router may be required to acquire a new route to the destination using the route discovery procedures as described above. A description of AODV may also be found in an IETF Internet draft, titled "Ad Hoc On Demand Distance Vector Routing", by Charles E. Perkins, Elizabeth M. Royer, and Samir Das, (2000) (Work in Progress) which is incorporated herein by reference in its entirety.

MANET uses mobile platforms (e.g., a router with multiple hosts and wireless communications devices), which may be free to move about arbitrarily. For example, MANET routers may be located in or on airplanes, ships, trucks, cars, perhaps even on people or very small devices, and there may be multiple hosts per router. A description of MANET may be found in RFC-2501, titled "Mobile Ad hoc Networking (MANET): Routing Protocol Performance Issues and Evaluation Considerations", by S. Corson, J. Macker, (January 1999), which is incorporated herein by reference in its entirety.

MANET routers may be equipped with wireless transmitters and receivers using antennas which may be omni-directional (broadcast), highly-directional (point-to-point), possibly steerable, or some combination thereof. At a given point in time, depending on the nodes' positions and their transmitter and receiver coverage patterns, transmission power levels and co-channel interference levels, a wireless connectivity in the form of a random, "ad hoc" network exists between the nodes. This ad hoc topology may change with time as the nodes move or adjust their transmission and reception parameters.

MANET allows flexibility in address assignment, since a router may be mobile. For example, MANET may use routers having one or more wireless IP interfaces assigned with their own IP address. MANET identifies routers belonging to a mobile "platform" using a unique router ID. Thus, in some instances, MANET allows router IDs to be used for routing computations, rather than IP addresses. Thus, MANET allows flexibility in networks having mobile routers.

Figure 2:
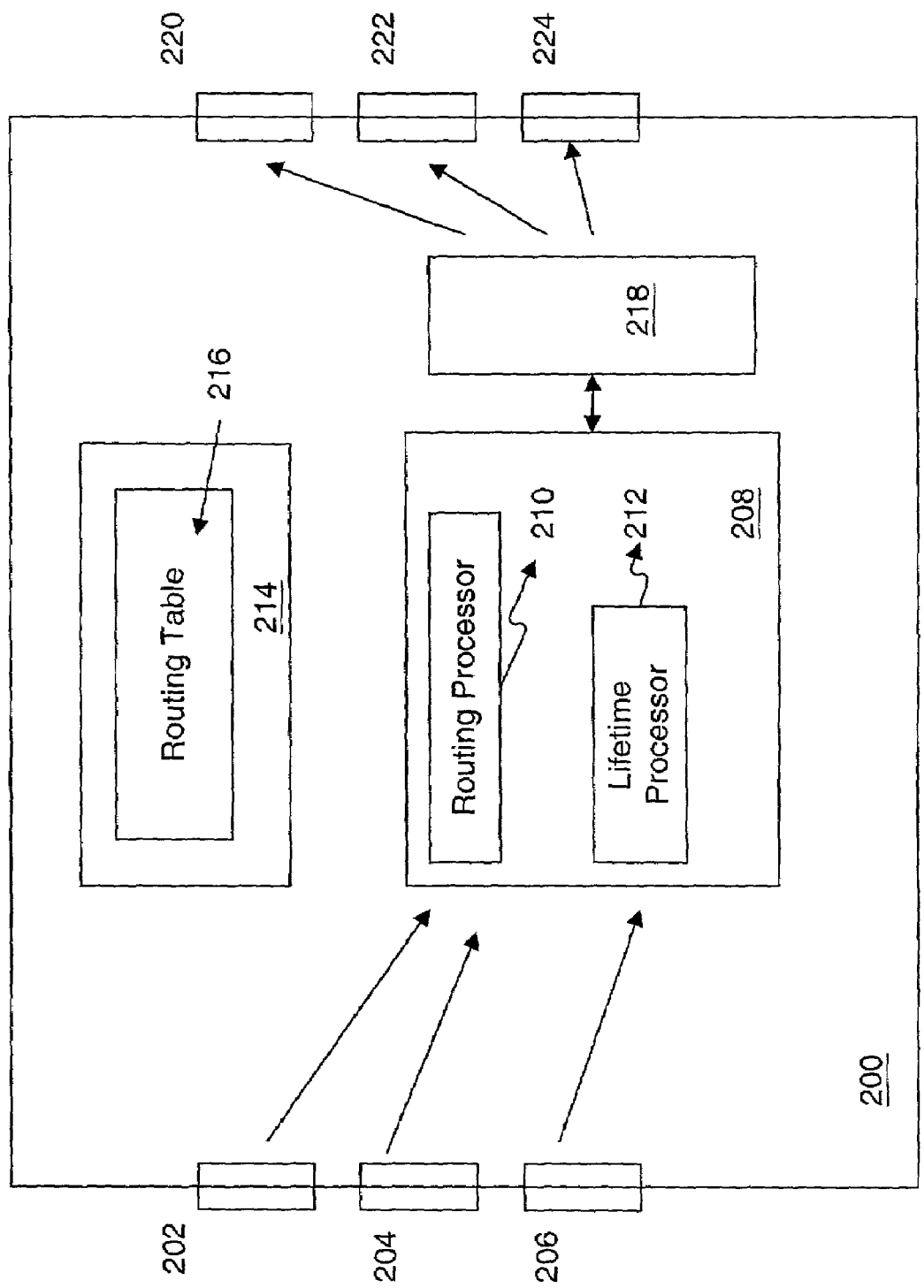
FIG. 2 shows a detailed view of a node configured in a manner consistent with the present invention.

FIG. 2 shows a detailed view of a node implemented as a router in a manner consistent with the present invention. In particular, a router 200 comprises input ports 202, 204, and 206, a processor 208 including a routing processor 210 and a lifetime processor 212, a memory 214 including a routing table 216, an output module 218, and output ports 220, 222, and 224.

Input ports 202, 204 and 206 receive incoming data packets from network 106. Although three input ports are shown, any number of input ports may be used in accordance with the principles of the invention.

Processor 208 processes the data packets received in input ports 202, 204 and 206. Processor 208 further comprises routing processor 210 and lifetime processor 210. Although routing processor 210 and lifetime processor 210 are depicted as separate structures within processor 208, processor 208 may also be implemented as a general purpose processor with routing processor 210 and lifetime processor 210 implemented in software executable by processor 208.

Routing processor 210 examines a data packet and determines a route for the data packet. For example, routing processor 210 may examine the header of an IP data packet to determine a source IP address, a destination IP address, protocol type, protocol version, size, and lifetime (i.e., TTL). Routing processor 210 may use the data packet's destination IP address to determine a route. However, routing processor 210 may use any information from a data packet to make a routing decision in accordance with the principles of the present invention.

Routing processor 210 then refers to memory 214 and searches routing table 216 based on the information examined, e.g., destination address, to determine the possible routes for the data packet. Routing processor 210 then selects an appropriate route. Routing processor 210 may select a route based on a wide variety of algorithms and parameters. For example, routing processor 210 may select a route based on minimizing hop count. Alternatively, routing processor 210 may select a route based upon delay, link bandwidth between nodes, network load, and communications cost. However, routing processor 210 may select a routed based upon any of a wide variety of parameters associated with a route in accordance with the principles of the present invention.

Lifetime processor 212 determines an appropriate lifetime for a data packet based on the route selected by routing processor 210 and the routing parameter, e.g., hop count. Lifetime processor 212 may use a wide variety of factors to determine an appropriate lifetime for the data packet. Lifetime processor 212 may use dynamic factors which vary according to network conditions. For example, lifetime processor 212 may track the number of network failures associated with a particular route to determine an appropriate lifetime. Alternatively, lifetime processor 212 may determine an appropriate lifetime based upon data indicating delays in receiving routing updates or detecting certain network events, e.g., network failures or topology changes.

In addition, lifetime processor 212 may use configured or fixed values to determine an appropriate lifetime. For example, lifetime processor 212 may use a fixed value as an error factor. Alternatively, lifetime processor 212 may use a multiplier, such as a percentage value, to determine an error factor. Lifetime processor 212 may use any algorithm for determining an error factor in accordance with the principles of the present invention.

Lifetime processor 212 may also determine if a data packet includes an existing TTL value, which has already been set, e.g., by host 100. If a TTL value has been set, then lifetime processor 212 decrements the TTL value. For example, the TTL value may be decremented by 1 hop or an amount of time. After decrementing the TTL value, the lifetime processor 212 passes the data packet to output module 218.

Output module 218 examines the routing and lifetime information, i.e., the TTL value, and prepares the data packet for forwarding. If the data packet is passed to output module 222 with a TTL value of "0", then output module 222 discards the data packet. If a data packet has a lifetime, i.e., a non-zero TTL value, then output module 222 encapsulates the data packet in a frame format and sets a TTL value in the frame header.

In one embodiment, output module 218 encapsulates the data packet in a wireless frame format and sets a TTL value within a field of the wireless frame header. For example, output module 218 may encapsulate the data packet in a wireless frame that complies with the Bluetooth™ standard or with IEEE 802.11. However, output module 218 may prepare a data packet for forwarding in a wide variety of ways in accordance with the principles of the present invention.

Output module 218 forwards the data packet to one of output ports 220, 222, and 224. Although three output ports are shown, any number of output ports may be used in accordance with the principles of the present invention.

FIG. 3 shows a detailed view of a routing table consistent with the present invention. In particular, a routing table, such as routing table 214, comprises a destination column 300, a next hop column 302, and a metric column 304. For example, routing table 214 is shown containing routing information for node 108, which includes hosts 100, 102, and 104 as destinations. For example, a data packet with a destination of host 102 has two possible routes, i.e., a route via a next hop to node 112 with a metric of 5 and a route via a next hop to node 110 with a metric of 4.

Destination column 300 may be used by routing processor 210 to search for possible routes to a particular destination. For example, destination column 300 provides destination IP addresses for a particular host as search criteria. Alternatively, destination column 300 may include other information, such as, source addresses for the data packet. Destination column 300 may include a wide variety of search criteria in accordance with the principles of the present invention.

Next hop column 302 indicates the next node to which a data packet needs to be forwarded for a particular route. Next hop column 302 may indicate the next hop in a wide variety of ways. For example, next hop column 302 may indicate a particular output port, an IP address, or an identifier of a next hop node to indicate the next hop for a particular route.

Metric column 304 indicates how a particular route is measured and selected. Metric column 304 may include a wide variety of routing metrics to measure a route. For example, metric column 304 may include hop count, delay, link bandwidth between nodes, network load, and communications cost as routing metrics.

For example, if node 108 receives a data packet, which has a destination of host 104, then routing processor 210 will find two routes in routing table 214. As shown in FIG. 3, at node 108, the data packet has one route via node 112 as a next hop with a hop count of 3 and another route via node 110 as a next hop with a hop count of 4. Routing processor 210 may select the route via node 112 since its route has a lower hop count.

Alternatively, routes may be measured in terms of time. For example, metric column 304 may measure a route in terms of seconds. However, any of a wide variety of parameters, which can be used to measure a route, may be used in accordance with the principles of the present invention.

Figure 4:
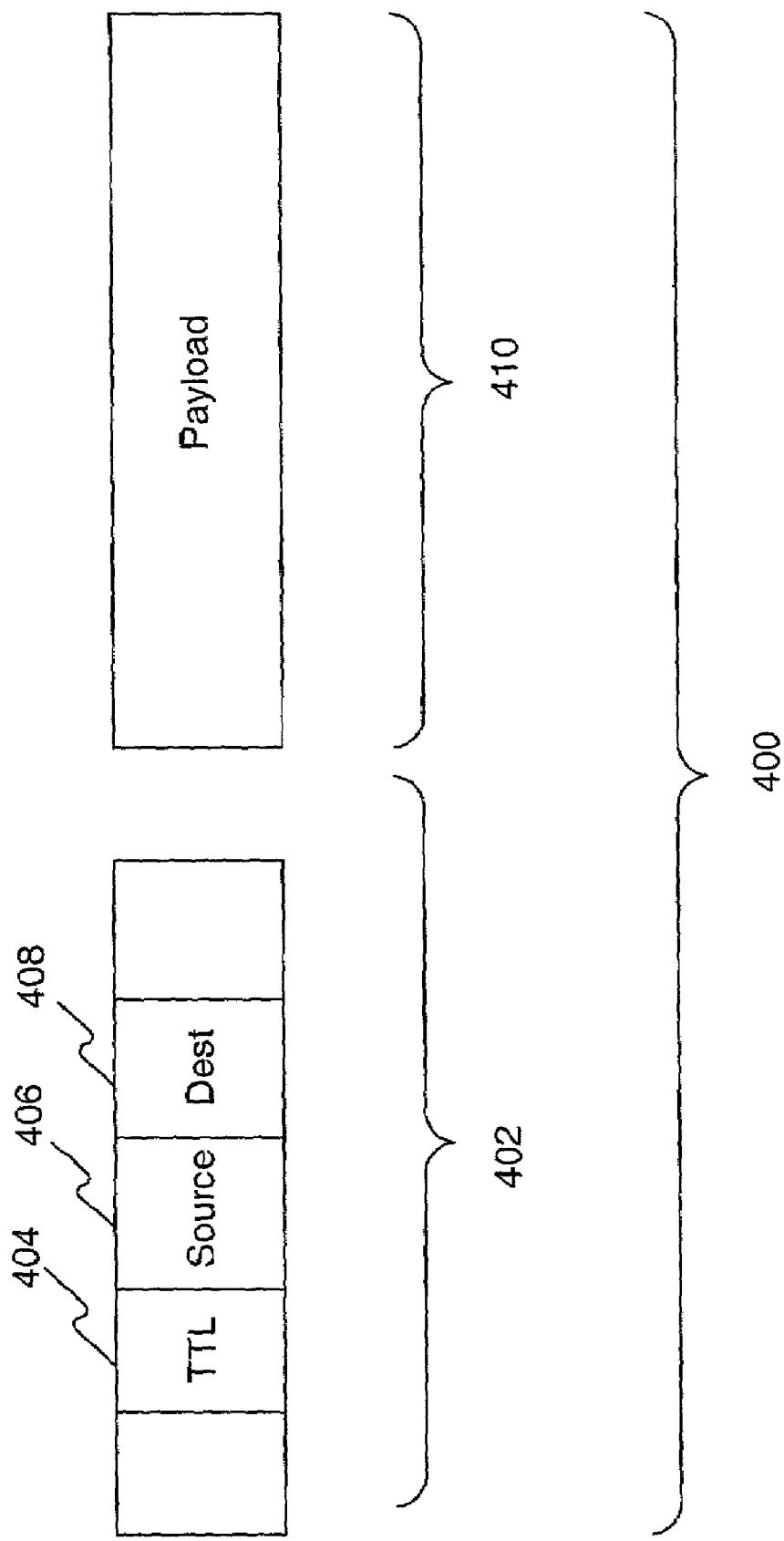
FIG. 4 shows a detailed view of a frame encapsulating a data packet consistent with the present invention.

FIG. 4 shows a detailed view of a frame encapsulating a data packet consistent with the present invention. In particular, a frame 400 comprises a header 402 and a payload 410. Header 402 includes a wide variety of information used for forwarding (or routing) of a data packet. For example, header 402 may include a TTL field 404, source address field 406, and a destination address field 408. As a data packet is forwarded, the information included within header 402 may change, for example, as the data packet is forwarded from node 108 to node 110.

Payload 410 may include user data such as data from host 100. Payload 410 which is not substantially changed as the data packet is forwarded through network 106. For example, an IP data packet may be carried within payload 410. In one embodiment, output module 222 encapsulates an IP data packet within payload 410 and uses a wireless frame format sets a TTL value in field 404. However, any of a wide variety of data packet formats may be used in accordance with the principles of the present invention. Therefore, since the TTL may be set based on the selected route to a destination, TTL values may be more accurate and automatically tailored according to network conditions.

Figure 5:
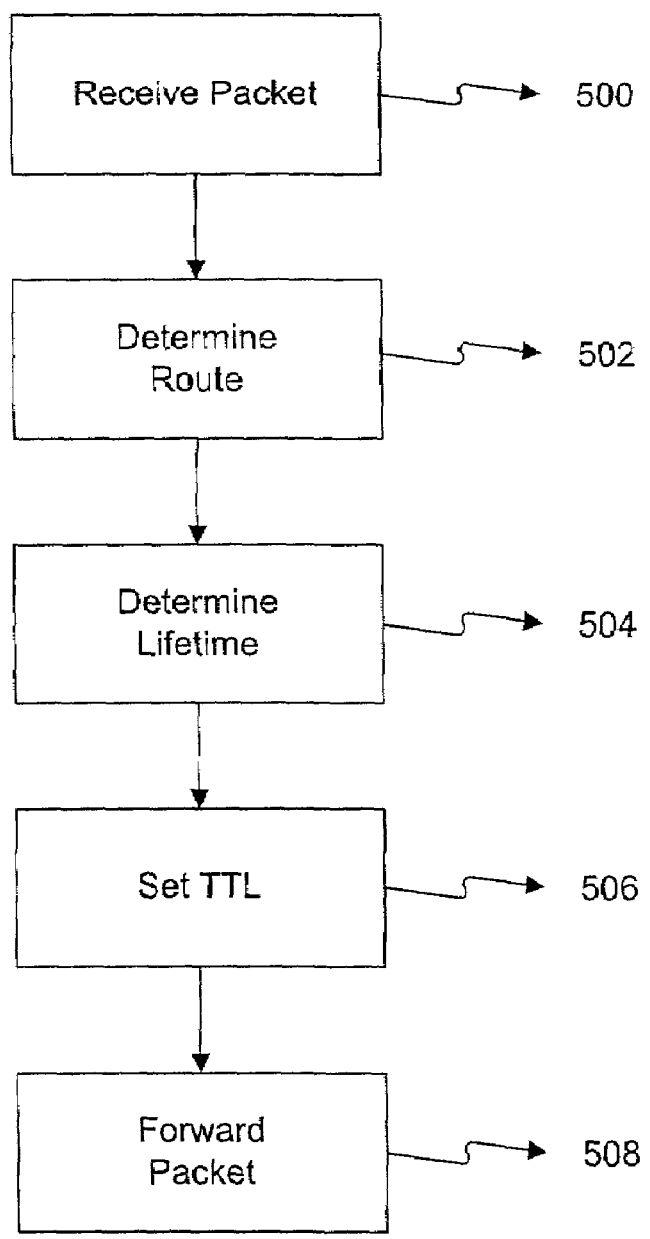
FIG. 5 shows a method for processing an incoming data packet consistent with the present invention.

FIG. 5 shows a method for processing an incoming data packet consistent with the present invention. In one embodiment the data packet may be an Internet Protocol ("IP") packet. However, any protocol for sending and receiving data across a network may be in accordance with the principles of the present invention.

In step 500 an incoming data packet may be received, e.g., at node 108. In step 502, a route may be determined for the incoming data packet. In particular, the data packet may be examined in order to determine how it should be processed and routed. For example, based on the information examined, a routing table may be queried to determine the possible routes. One of the routes may be then be selected according to a wide variety of algorithms and protocols. As described above, SPF, DV, MANET, and AODV are examples of algorithms and protocols for selecting a route for a data packet. For example, in conjunction with MANET or AODV, a route may be selected based on hop count for a particular destination, delay, or bandwidth between nodes (e.g., nodes 108, 110, 112, 114, 116, and 118).

In step 504 an appropriate lifetime for the data packet may be determined based on the route selected. Lifetime for the data packet can be measured in a wide variety of ways. For example, time, and hop count may be used. In one embodiment, the data packet may be measured in number of hops. In another embodiment, data packet lifetime may be measured in terms of time. However, any way of measuring the lifetime of a data packet may be used in accordance with the principles of the present invention.

An error factor may also be included in the lifetime determination for a data packet. An error factor may be useful to account for variations in network conditions or in the event of a failure. For example, network load may be high causing a data packet to require a longer than normal amount of time to reach its destination. The error factor may incorporate a fixed value or fixed percentage, which may be added to a data packet's lifetime. The error factor may also be determined dynamically at any point in a packet's lifetime based upon network conditions. However, any error factor which aids in compensating for variations in a data packets lifetime may be used in accordance with the principles of the present invention.

In step 506 an appropriate TTL value based on the lifetime determined for the date packet may be set for the data packet. For example, a frame header or IP header provide specific fields for a TTL. In one embodiment, the lifetime value of the data value may be tagged by setting the TTL field in an IP data packet. In another embodiment, the lifetime value may be set in a frame header, which may be in addition to the IP format for the data packet. However, any of a wide variety of ways of setting a TTL value for a data packet may be in accordance with the principles of the present invention. In step 508 the data packet may be then forwarded with a tagged lifetime, e.g., to node 112.

Figure 6:
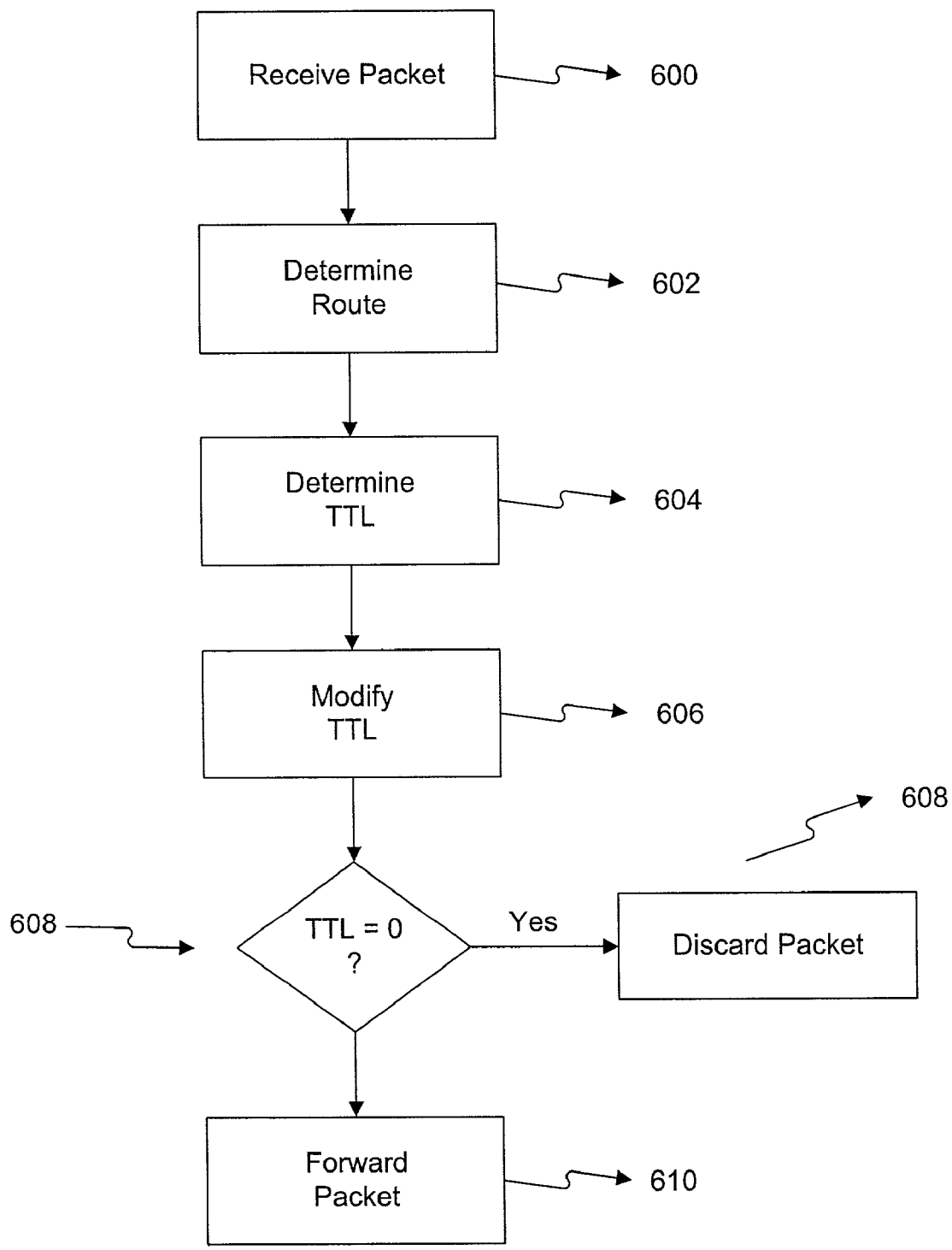
FIG. 6 shows a method for processing a data packet within a network consistent with the present invention.

FIG. 6 shows a method for processing a data packet within a network consistent with the present invention. In step 600 a data packet may be received, e.g., from node 108 to node 112. In step 602, a route for the data packet may be determined. In particular, the data packet may be examined in order to determine how it should be processed and routed. For example, the data packet may be examined to determine its source and destination addresses. In one embodiment, a data packet may be examined to determine its destination IP addresses. However, any information which may be examined to determine how a data packet should be routed in accordance with the principles of the present invention.

Based on the information examined, a routing table may be queried to determine the possible routes and one of the routes may be selected. A route may be selected according to a wide variety of criteria which may include algorithms and protocols. In one embodiment, a route may be selected based on hop count for a particular destination. In another embodiment, a route may be selected based on delay. However, any of a wide variety of algorithms may be used to select a route in accordance with principles of the present invention.

In step 604, the data packet's TTL may be determined. For example, the TTL value may be read from a field in frame header field 404 or from a field within an IP TTL header field (not shown). In one embodiment, the TTL value may be read from a field in a frame header. However, any of a wide variety of ways for determining a data packet's TTL value may be used in accordance with the principles of the present invention.

In step 606, the TTL value may be decremented. For example, the TTL value may be decremented by 1 hop or decremented by an amount of time. In one embodiment, the TTL may be a hop count and decremented by 1 hop. However, any of wide variety of values for decrementing the TTL value may be used in accordance with the principles of the present invention.

In step 608, the TTL value may be checked to see if it has reached a value of 0. If the TTL may be 0, then in step 608 the data packet may be discarded. If the TTL value may be not 0, then in step 610 the data packet may be forwarded. Therefore, by using TTL values which may be tailored to network conditions, e.g., based on the selected route for a data packet, data packets may be efficiently routed with accurate TTL values and discarded sooner than if a large inaccurate TTL value were used.

One skilled in the art will appreciate that all or part of methods and apparatus consistent with the present invention may be implemented in hardware, software or any combination thereof using various computer-readable media, such as secondary storage devices, like hard disks, floppy disks, and CD-ROM.

Although specific components have been described, one skilled in the art will also appreciate that the methods and apparatus consistent with the present invention may contain additional or different components. Other embodiments and modifications of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for routing a plurality of data packets in a network, comprising:
   receiving a data packet of the plurality having a destination;
   determining a route for the data packet based on the destination;
   determining a lifetime for the data packet based on the route;
   setting a time-to-live value for the data packet based on the lifetime; and
   forwarding the data packet along the route.

2. The method according to claim 1, further comprising:
   detecting an event affecting the route; and
   modifying the time-to-live value based on the event.

3. The method according to claim 1, wherein determining the lifetime comprises:
   incorporating an error factor based on the route for the data packet.

4. The method according to claim 1, wherein forwarding the data packet comprises:
   encapsulating the data packet in a wireless packet format; and
   setting the time-to-live value in a field of the wireless packet format.

5. A data packet processing node comprising:
   an input to receive a data packet having a destination;
   a route processor to determine at least one route for the data packet based on the destination;
   a lifetime processor to set a lifetime for the data packet based on the at least one route; and
   an output to forward the data packet along the route.

6. The network node according to claim 5, wherein the lifetime processor further comprises:
   an event detector to detect an event affecting the at least one route.

7. The network node according to claim 5, wherein the lifetime processor further comprises an error factor processor to determine an error factor to associated with the route.

8. The network node according to claim 5, wherein the output to forward the data packet further comprises a wireless interface to encapsulate the data packet in a wireless packet format.

9. The network node according to claim 8, wherein the wireless interface sets, in a field of the wireless packet format, the time-to-live value based on the lifetime for the data packet.

10. An apparatus comprising:
    means for receiving a data packet having a destination;
    means for determining a route for the data packet based on the destination;
    means for determining a lifetime for the data packet based on the route;
    means for setting a time-to-live value for the data packet based on the lifetime; and
    means for forwarding the data packet along the route.

11. A computer readable medium capable of configuring a device to perform a method for managing data packets in a network, the method comprising:
    receiving a data packet having a destination;
    determining a route for the data packet based on the destination;
    determining a lifetime for the data packet based on the route;

setting a time-to-live value for the data packet based on the lifetime; and forwarding the data packet along the route.

12. A network for forwarding a data packet from a source to a destination based on a lifetime for the data packet along a route, said network comprising:
 a first node including:
  means for receiving, from said source, a data packet having a destination;
  means for determining a route for the data packet based on the destination;
  means for determining a lifetime for the data packet based on the route;
  means for setting a time-to-live value for the data packet based on the lifetime;
  means for forwarding the data packet to a second node along the route; and
 a second node including
  means for receiving, from the first node, the data packet;
  means for determining the time-to-live value set for the data packet;
  means for modifying the time-to-live value to form a modified time-to-live value;
  means for forwarding the data packet based on the modified time-to-live value.

13. The network according to claim 12, wherein:
 the first node and the second node are ad-hoc routers.

14. The network according to claim 12, wherein the means for forwarding of the second node forwards the data packet towards the destination along the route, when the modified time-to-live value is greater than 0.

15. The network according to claim 12, wherein the means for forwarding of the second node discards the data packet, when the modified time-to-live value is 0.

* * * * *